US010803274B2

(12) United States Patent
Williams et al.

(10) Patent No.: US 10,803,274 B2
(45) Date of Patent: Oct. 13, 2020

(54) COMPUTER CONFIGURED TO DISPLAY MULTIMEDIA CONTENT

(71) Applicant: Honeywell International Inc., Fort Mill, SC (US)

(72) Inventors: Timothy Williams, Northport, NY (US); Timothy Meier, Camillus, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/433,452

(22) Filed: Jun. 6, 2019

(65) Prior Publication Data
US 2019/0286867 A1 Sep. 19, 2019

Related U.S. Application Data

(63) Continuation of application No. 15/693,659, filed on Sep. 1, 2017, now Pat. No. 10,360,426, which is a continuation of application No. 15/092,963, filed on Apr. 7, 2016, now Pat. No. 9,754,147, which is a continuation of application No. 14/605,222, filed on Jan. 26, 2015, now Pat. No. 9,311,516, which is a continuation of application No. 13/538,163, filed on Jun. 29, 2012, now Pat. No. 8,944,313.

(51) Int. Cl.
| | |
|---|---|
| G06F 17/00 | (2019.01) |
| G06K 7/14 | (2006.01) |
| G06F 16/43 | (2019.01) |
| G06F 16/955 | (2019.01) |
| G06K 7/10 | (2006.01) |

(52) U.S. Cl.
CPC .......... *G06K 7/1443* (2013.01); *G06F 16/43* (2019.01); *G06F 16/9554* (2019.01); *G06K 7/1439* (2013.01); *G06K 7/1447* (2013.01); *G06K 2007/10524* (2013.01)

(58) Field of Classification Search
CPC ............... G06F 16/43; G06F 16/9554; G06K 2007/10524; G06K 7/1439; G06K 7/1443; G06K 7/1447
See application file for complete search history.

(56) References Cited

U.S. PATENT DOCUMENTS

| | | |
|---|---|---|
| 5,329,106 A | 7/1994 | Hone et al. |
| 5,414,251 A | 5/1995 | Durbin |

(Continued)

OTHER PUBLICATIONS

Notice of Allowance for U.S. Appl. No. 13/538,163 dated Jan. 5, 2015, 7 pages.

(Continued)

*Primary Examiner* — Thien M Le
(74) *Attorney, Agent, or Firm* — Alston & Bird LLP

(57) ABSTRACT

A computer can comprise a housing, a microprocessor disposed within the housing, a display, and a communication interface communicatively coupled to the microprocessor. The computer can be configured, responsive to locating decodable indicia within content viewable on the display, to decode the decodable indicia to produce at least one decoded message. The computer can be further configured to display the content with decoded message data being embedded into the content. The decoded message data can be provided by at least one decoded message, data derived from the decoded message.

20 Claims, 7 Drawing Sheets

(56) References Cited

U.S. PATENT DOCUMENTS

| | | | |
|---|---|---|---|
| 5,902,988 A | 5/1999 | Durbin | |
| 6,141,042 A | 10/2000 | Martinelli et al. | |
| 6,164,545 A | 12/2000 | Danielson | |
| 7,261,238 B1 | 8/2007 | Carlson et al. | |
| 7,537,162 B1 | 5/2009 | Siu | |
| 7,831,912 B2 | 11/2010 | King et al. | |
| 7,963,446 B2 | 6/2011 | Harris | |
| 7,988,050 B2 | 8/2011 | Kitada et al. | |
| 8,087,583 B2 | 1/2012 | Hawes | |
| 8,120,818 B2 | 2/2012 | Nagata | |
| 8,430,317 B2 | 4/2013 | Ross | |
| 8,587,595 B2 | 11/2013 | Wang | |
| 8,917,422 B2 | 12/2014 | Rakshit | |
| 8,944,313 B2 | 2/2015 | Williams et al. | |
| 8,944,322 B2 | 2/2015 | White | |
| 9,292,611 B1 | 3/2016 | Gysin et al. | |
| 9,311,516 B2* | 4/2016 | Williams | G06K 7/1439 |
| 9,754,147 B2 | 9/2017 | Williams et al. | |
| 2003/0048922 A1* | 3/2003 | Rhoads | G06T 1/0028 |
| | | | 382/100 |
| 2004/0057581 A1* | 3/2004 | Rhoads | H04N 1/32144 |
| | | | 380/59 |
| 2004/0118923 A1 | 6/2004 | Creamer et al. | |
| 2005/0279832 A1 | 12/2005 | Kobayashi et al. | |
| 2006/0283952 A1 | 12/2006 | Wang | |
| 2007/0138289 A1 | 6/2007 | Melick et al. | |
| 2007/0164111 A1 | 7/2007 | Wang et al. | |
| 2007/0267501 A1 | 11/2007 | Jovanovski et al. | |
| 2008/0093456 A1 | 4/2008 | Pasik et al. | |
| 2008/0230607 A1 | 9/2008 | Etten | |
| 2009/0109484 A1 | 4/2009 | Honda | |
| 2009/0190183 A1 | 7/2009 | Hosoda | |
| 2009/0214137 A1 | 8/2009 | Takahashi | |
| 2010/0072269 A1 | 3/2010 | Scott et al. | |
| 2010/0091313 A1 | 4/2010 | Kitada et al. | |
| 2010/0250351 A1 | 9/2010 | Gillenson et al. | |
| 2010/0250356 A1 | 9/2010 | Gillenson et al. | |
| 2010/0250359 A1 | 9/2010 | Gillenson et al. | |
| 2011/0019220 A1 | 1/2011 | Kikuchi | |
| 2011/0026081 A1 | 2/2011 | Hamada et al. | |
| 2011/0029363 A1 | 2/2011 | Gillenson et al. | |
| 2011/0207531 A1 | 8/2011 | Gagner et al. | |
| 2012/0037695 A1 | 2/2012 | Liu et al. | |
| 2012/0047424 A1 | 2/2012 | Rothschild | |
| 2012/0064971 A1 | 3/2012 | Devine et al. | |
| 2012/0173347 A1 | 7/2012 | De et al. | |
| 2013/0088555 A1* | 4/2013 | Hanina | B41J 3/407 |
| | | | 347/107 |
| 2013/0126599 A1* | 5/2013 | Soske | G06Q 30/02 |
| | | | 235/375 |
| 2013/0161397 A1 | 6/2013 | Bremer et al. | |
| 2014/0027503 A1 | 1/2014 | Kennedy et al. | |
| 2016/0292485 A1 | 10/2016 | Williams et al. | |

OTHER PUBLICATIONS

Notice of Allowance for U.S. Appl. No. 14/605,222, dated Dec. 10, 2015, 9 pages.

Notice of Allowance for U.S. Appl. No. 15/092,963, dated May 5, 2017, 9 pages.

Notice of Allowance for U.S. Appl. No. 15/693,659, dated Mar. 11, 2019, 9 pages.

Office Action for U.S. Appl. No. 13/538,163, dated Apr. 9, 2014, 15 pages.

Office Action for U.S. Appl. No. 14/605,222, dated Sep. 18, 2005, 9 pages.

Office Action for U.S. Appl. No. 15/092,963, dated Jan. 12, 2017, 16 pages.

Office Action for U.S. Appl. No. 15/693,659, dated May 17, 2018, 11 pages.

Office Action for U.S. Appl. No. 15/693,659, dated Oct. 24, 2018, 8 pages.

Notice of Allowance and Fees Due (PTOL-85) dated Oct. 3, 2014 for U.S. Appl. No. 13/538,163.

* cited by examiner

COMPUTER CONFIGURED TO DISPLAY MULTIMEDIA CONTENT

CROSS-REFERENCE TO RELATED APPLICATIONS

The present application is a continuation of U.S. patent application Ser. No. 15/693,659 for a Computer Configured to Display Multimedia Content filed Sep. 1, 2017 (and published Jan. 11, 2018 as U.S. Patent Publication No. 2018/0012051), which is a continuation of U.S. patent application Ser. No. 15/092,963 for a Computer Configured to Display Multimedia Content filed Apr. 7, 2016 (and published Oct. 6, 2016 as U.S. Patent Publication No. 2016/0292485), now U.S. Pat. No. 9,754,147, which is a continuation of U.S. patent application Ser. No. 14/605,222 for a Computer Configured to Display Multimedia Content filed Jan. 26, 2015 (and published Jun. 18, 2015 as U.S. Patent Publication No. 2015/0169929), now U.S. Pat. No. 9,311,516, which claims priority to and the benefit of U.S. patent application Ser. No. 13/538,163 for a Computer Configured to Display Multimedia Content filed Jun. 29, 2012 (and published Jan. 2, 2014 as U.S. Patent Application Publication No. 2014/0001254), now U.S. Pat. No. 8,944,313. Each of the foregoing patent applications, patent publications, and patents is hereby incorporated by reference in its entirety.

FIELD OF THE INVENTION

The present invention relates generally to computers, and in particular to computers configured to display multimedia content.

BACKGROUND

Computers equipped with displays (including mobile communication terminals such as smartphones, mobile phones, personal digital assistants, etc.) are widely used for displaying multimedia content, including still images, video streams, document files, etc. The displayed multimedia content can comprise images of optical decodable indicia, e.g., bar codes.

SUMMARY

In one embodiment, there is provided a computer comprising a housing, a microprocessor disposed within the housing, a display, and a communication interface communicatively coupled to the microprocessor. The computer can be configured, responsive to locating decodable indicia within content viewable on the display, to decode the decodable indicia to produce at least one decoded message. The computer can be further configured to display the content with decoded message data being embedded into the content. The decoded message data can be provided by a decoded message and/or data derived from the decoded message.

In a further aspect, the content can be provided by a video stream, an image file, and/or a document file.

In a further aspect, the computer can be further configured to derive the decoded message data from the decoded message by dereferencing a reference comprised by the decoded message.

In a further aspect, the computer can be further configured to display the decoded message data responsive to a user interface action received while the content is being displayed.

In a further aspect, the computer can be further configured to locate the decodable indicia within the content responsive to receiving a byte stream representing the content via the communication interface.

In a further aspect, the computer can be further configured to display the content responsive to a user interface action.

In a further aspect, the computer can be further configured to decode the decodable indicia by transmitting at least part of the content to an external computer for decoding.

In some embodiments, the computer can further comprise an encoded information reading (EIR) device provided by a bar code reading device, an RFID reading device, or a card reading device. In a further aspect, the EIR device can be configured to perform output raw message data containing an encoded message and/or output decoded message data corresponding to an encoded message.

In a further aspect, the computer can be provided by a smart phone, a mobile phone, a personal digital assistant (PDA), or an EIR terminal.

In a further aspect, the communication interface can be provided by a wireless communication interface.

In another embodiment, there is provided a method of displaying content comprising one or more images of decodable indicia by a computer. The method can comprise the steps of locating decodable indicia within content viewable on the display, decoding the decodable indicia to produce at least one decoded message, and displaying the content with decoded message data being embedded into the content. The decoded message data can be provided by at least one decoded message and/or data derived from the decoded message.

In a further aspect, the content can be provided a video stream, an image file, and/or a document file.

In a further aspect, the decoded message data can be derived from the decoded message by dereferencing a reference comprised by the decoded message.

In a further aspect, the step of embedding the decoded message data can comprise visually embedding the decoded message data into the content.

In a further aspect, the decoded message data can be viewable responsive to a user interface action.

In a further aspect, the step of locating the decodable indicia can be performed responsive to receiving a byte stream representing the content via the communication interface.

In a further aspect, the step of displaying the content can be performed responsive to a user interface action.

In a further aspect, the step of decoding the decodable indicia can be performed by transmitting at least part of the content to an external computer for decoding.

In a yet another embodiment, there is provided a data decoding system comprising a client computer and one or more servers communicatively coupled to a network. The servers can execute at least one decoding process. The client computer can be configured, responsive to locating decodable indicia within content viewable on the display, to transmit to at least one server a decoding request comprising at least part of the content. The decoding process can be configured, responsive to receiving the decoding request, to decode the decodable indicia into at least one decoded message. The decoding process can be further configured, responsive to completing a decoding operation, to transmit at least one decoded message and/or a decoding operation completion code to the client computer. The client computer can be further configured to display the content with decoded message data being embedded into the content. The decoded message data can be provided by at least one decoded message and/or data derived from the decoded message.

In a further aspect, the content can be provided a video stream, an image file, and/or a document file.

In a further aspect, the decoded message data can be derived from the decoded message by dereferencing a reference comprised by the decoded message.

In a further aspect, the client computer can be further configured to visually embed the decoded message data into the content.

In a further aspect, the client computer can be further configured to display the decoded message data responsive to a user interface action received while the content can be displayed.

In a further aspect, the client computer can be further configured to display the content responsive to a user interface action.

In some embodiments, the client computer can comprise an encoded information reading (EIR) device provided by a bar code reading device, an RFID reading device, or a card reading device. In a further aspect, the EIR device can be configured to output raw message data containing an encoded message and/or output decoded message data corresponding to an encoded message.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION

Figure 1B:
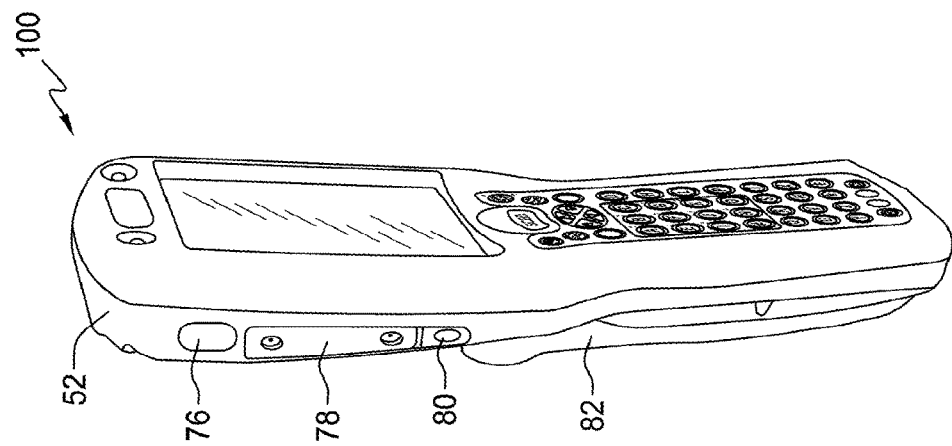
FIGS. 1a-1c schematically illustrate one embodiment of a mobile communication terminal described herein.

A "communication network" or "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks.

A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In a yet another embodiment, a computer can be provided by a mobile communication terminal. In a yet another embodiment, a computer can be provided by an encoded information reading (EIR) terminal. In a yet another embodiment, a computer can be provided by a personal digital assistant (PDA). In a yet another embodiment, a computer can be provided by a smartphone.

A "message" herein shall refer to a byte sequence or a character string comprising alphanumeric and/or non-alphanumeric characters.

A "process" herein shall refer to an instance of a computer program that is being executed; in some operating systems, several processes can be instantiated simultaneously. In some operating systems, several processes can be executed concurrently. In some operating systems, several processes can be instantiated simultaneously from the same computer program.

In one embodiment, there is provided a computer equipped with a display. The computer can be used for displaying multimedia content, including still images, video streams, document files, etc. The content can be downloaded by the computer via a wired or wireless communication interface. Alternatively, the computer can employ its imaging device to acquire moving or still images. The computer can store the downloaded or acquired content in its memory and/or display the content on its display.

Multimedia content displayed by the computer described herein can contain images of optical decodable indicia, e.g., bar codes. To enhance the user's viewing experience, the computer described herein can be adapted to decode the decodable indicia and visually embed the decoded message or data derived from the decoded message into the multimedia content being displayed. For example, the decoded message or the data derived from the decoded message can be overlaid over the image of the corresponding decodable indicia. In another example, the decoded message can be displayed within a tooltip associated with a screen pointer (e.g., a cursor) responsive to the user's hovering the pointer over the image of the decodable indicia.

In a further aspect, the computer described herein can be adapted to improve the user's viewing experience by locating images of decodable indicia within the content and decoding the decodable indicia ahead of the time the content is displayed.

In a further aspect, the computer can transmit images of decodable indicia to a decoding server for decoding. This can be particularly useful in situations when the computer (e.g., a mobile communication terminal) lacks the processing resources needed to simultaneously display multimedia content and perform decodable indicia decoding. In another illustrative example, the computer can lack one or more software modules implementing methods needed to decode a particular type of decodable indicia. Alternatively, the computer described herein can perform the decoding locally.

Hence, in one embodiment, there is provided an optical indicia decoding system comprising an imaging client computer (provided, e.g., by a mobile communication terminal) and one or more decoding server computers communicatively coupled to a communication network. The decoding server computers can execute one or more decoding processes.

The imaging client can locate decodable indicia within the content viewable on the display and to transmit to a decoding server a decoding request comprising at least part of the content. The decoding server, responsive to receiving the decoding request, can decode the decodable indicia into one or more decoded messages and transmit the decoding result to the imaging client. The imaging client can be further configured to visually embed the decoded message or data derived from the decoded message into the multimedia content and display the multimedia content, e.g., responsive to a user interface action.

Figure 1C:
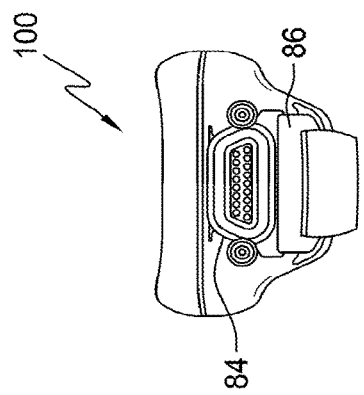
Figure 1A:
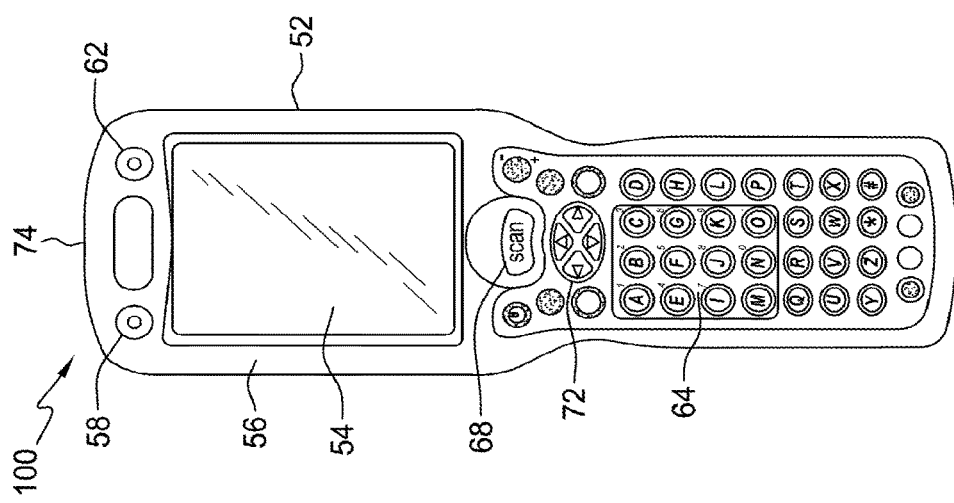

As noted herein supra, in some embodiments, the computer described herein can be provided by a mobile communication terminal. One embodiment of the mobile communication terminal is shown in FIGS. 1a (front panel view), 1b (side panel view), and 1c (bottom panel view). The mobile communication terminal 100 can comprise a housing 52 within which other components of mobile communication terminal 100 can be disposed. A display 54 can be embedded into housing 52 and disposed on the front panel 56. Also disposed on the front panel 56 can be a decode LED 58, a scan LED 62, and a keyboard 64 including a scan key 68 and navigation keys 72. An imaging window 74 can be disposed on the top panel of the housing 52. Disposed on the side panel (best viewed in FIG. 1b) can be an infra-red communication port 76, an access door to a secure digital (SD) memory interface 78, an audio jack 80, and a hand strap 82. Disposed on the bottom panel (best viewed in FIG. 1c) can be a multi-pin mechanical connector 84 and a hand strap clip 86. A skilled artisan would appreciate the fact that other types and form factors of mobile communication terminal housings are within the scope of this disclosure.

Figure 2:
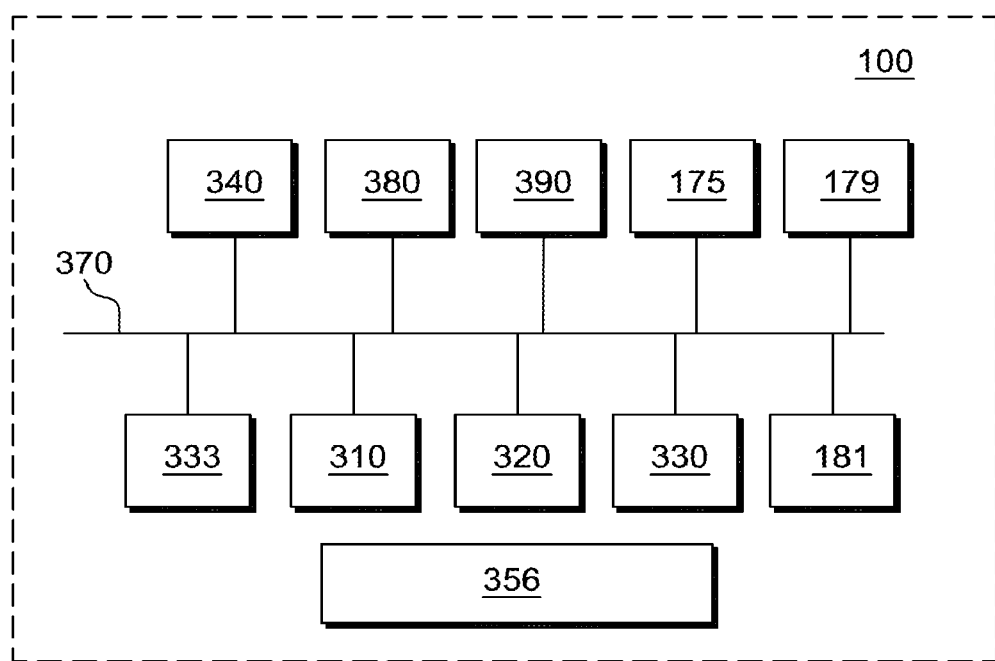
FIG. 2 depicts a component-level layout of a computer described herein.

FIG. 2 depicts a component-level diagram of one embodiment of a computer described herein. The computer 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, computer 100 can comprise a single microprocessor which can be referred to as a central processing unit (CPU). In another embodiment, computer 100 can comprise two or more microprocessors. A skilled artisan would appreciate the fact that various schemes of processing tasks distribution among two or more microprocessors are within the scope of this disclosure.

Computer 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family. In a further aspect, the communication interface can be at least partially disposed within housing 52. In some embodiments, wireless communication interface can comprise an antenna which can at least partially be disposed outside of housing 52.

Computer 100 can further comprise an imaging device 330, provided, for example, by a two-dimensional imager. In some embodiments, a computer 100 can further comprise a graphical user interface including a display adapter 175 and a keyboard 179. In some embodiments, a computer 100 can further comprise an audio output device, e.g., a speaker 181.

In some embodiments, computer 100 can further comprise an EIR device 333. The EIR device can be provided, for example, by a bar code reading device, an RFID reading device, and/or a card reading device. The EIR device can be configured to output raw message data containing an encoded message and/or output decoded message data corresponding to an encoded message. An encoded message can be used to convey information, such as identification of the source and the model of an item, for example, in a UPC code.

As noted herein supra, in some embodiments, computer 100 can be provided by a mobile communication terminal. Mobile embodiments of computer 100 can comprise a battery 356. In one embodiment, the battery 356 can be provided by a replaceable rechargeable battery pack. Computer 100 can further comprise a GPS receiver 380. Computer 100 can further comprise at least one connector 390 configured to receive a subscriber identity module (SIM) card.

As noted herein supra, computer 100 can in one embodiment be configured to download multimedia content containing images of decodable indicia. In some embodiments, computer 100 can employ its imaging device to acquire multimedia content provided by still images and/or video streams. Computer 100 can be further configured to store in its memory the content downloaded via communication interface 340 or acquired using imaging device 330.

Computer 100 can be further configured to locate the decodable indicia contained within the content and produce a decoded message by decoding the decodable indicia either locally or by transmitting a decoding request to an external decoding server. In one embodiment, computer 100 can perform locating and decoding operations responsive to downloading or acquiring multimedia content. In another embodiment, computer 100 can perform locating and decoding operations within the multimedia content being downloaded or acquired via the imaging device. In a yet another embodiment, computer 100 can perform locating and decoding operations responsive to receiving a user interface action, e.g., a graphical user interface (GUI) command to display multimedia content. In a yet another embodiment, computer 100 can look ahead and locate decodable indicia within the multimedia content being displayed.

The decoding operation result can comprise the decoding operation completion code and/or the decoded message. The decoding operation completion code can indicate whether the decoding operation was successful or unsuccessful, and in the latter case can further indicate one or more reasons of unsuccessful decoding attempt, e.g., failure to locate decodable indicia, unknown symbology, etc.

Figure 3A:
FIGS. 3a-3c illustrate various methods of visually embedding decoded message data into multimedia content to be displayed.
Figure 3B:
Figure 3B:
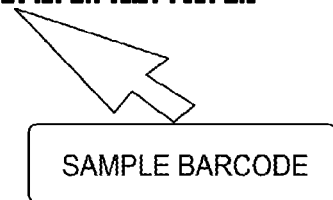
Figure 3C:
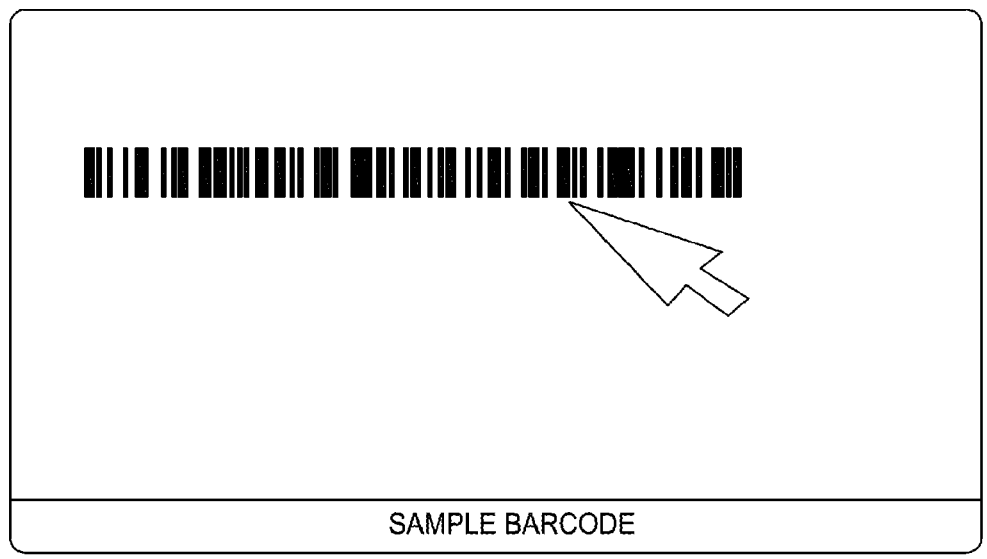

Computer 100 can be further configured to display the content responsive to a user interface action or another event (e.g., responsive to acquiring a still image or a video stream). Computer 100 can be further configured to visually embed the decoded message and/or data derived from the decoded message into the multimedia content to be displayed. In one example, the decoded message can be visually overlaid over the image of the corresponding decodable indicia, as schematically shown in FIG. 3a. In another example, schematically illustrated in FIG. 3b, the decoded message can be displayed within a tooltip associated with a screen pointer (e.g., a cursor) responsive to a pre-determined GUI event (e.g., MouseOver event raised responsive to the user's hovering the screen pointer over an image of the decodable indicia) received while the content containing the decodable indicia is being displayed. In a yet another example, responsive to a pre-determined GUI event, the decoded message can be displayed within a status bar or other designated area of the display, as schematically shown in FIG. 3c.

In some embodiments, the decoded message can contain a reference to content that can be retrieved by the computer 100. For example, the decoded message can contain a uniform resource locator (URL) identifying a resource (e.g., an HTML file) accessible by computer 100 via the Internet. In another example, the decoded message can contain a UPC code, and the corresponding product description can be retrieved by computer 100 from an embedded or external database. Computer 100 can be configured to derive the decoded message data from the decoded message by dereferencing a reference comprised by the decoded message, and to visually embed the data derived from the decoded message (e.g., at least part of the content referenced by the decoded message) into the multimedia content to be displayed. As an example of this, if the decoded message data was a URL, the dereferencing of it may be loading a thumbnail of the webpage referenced by the URL. Another example might be that the decoded message is the UPC code of a particular product, and dereferencing may be loading a thumbnail of a website describing the product or doing a price check on it.

Figure 4A:
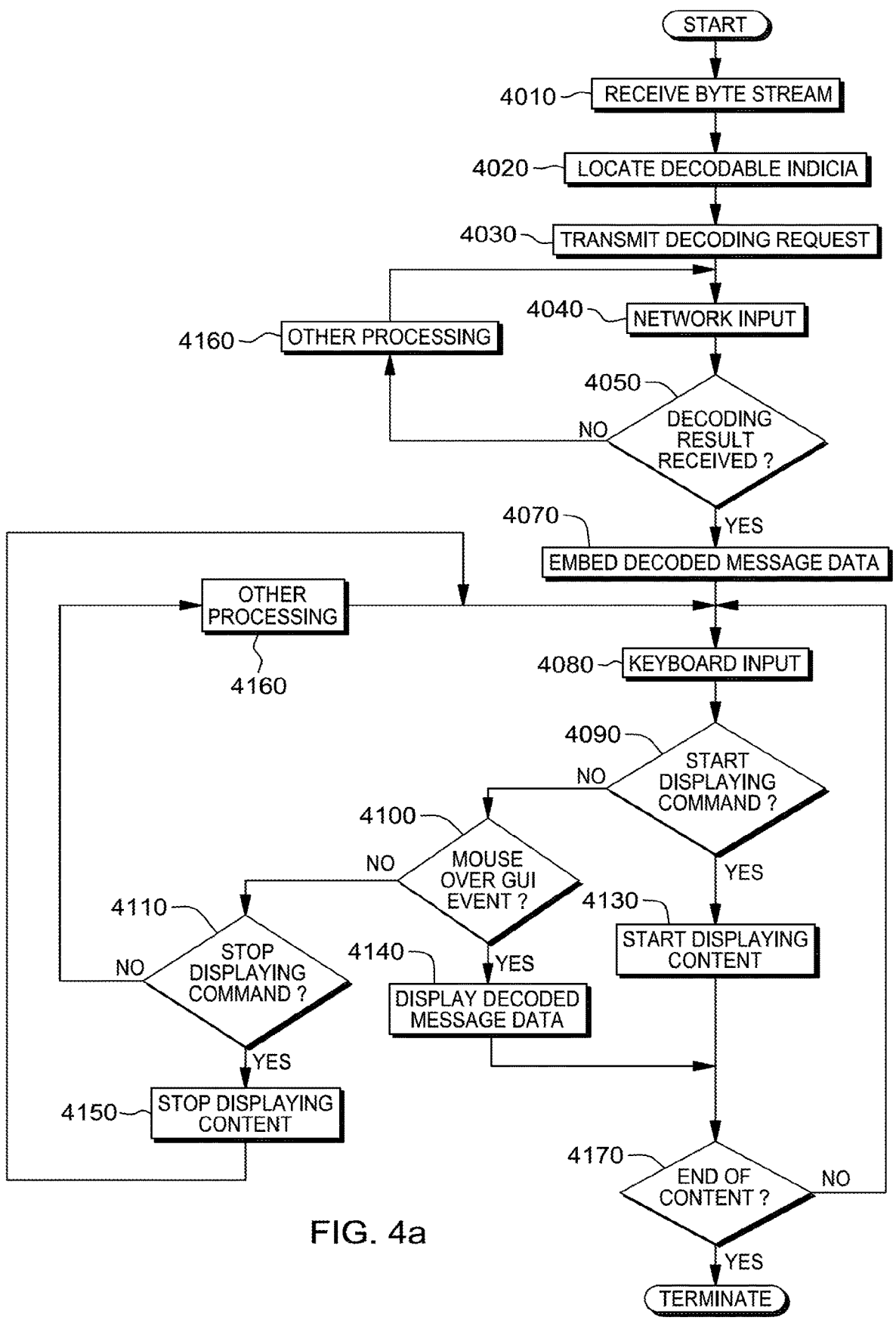
FIGS. 4a-4b illustrate flowcharts of various illustrative embodiments of a method of displaying content comprising one or more images of decodable indicia.

One illustrative embodiment of a method of displaying content comprising one or more images of decodable indicia is now being described with references to the flowchart of FIG. 4a.

Processing commences by the computer receiving, at step 4010, a byte stream representing multimedia content including still images, video streams, document files, etc. In one embodiment, the computer can download the multimedia content over a communication interface. Alternatively, the computer can employ its imaging device to acquire multimedia content including still images and/or video streams. The received multimedia content can be stored in the memory of the computer.

At step 4020, the computer can locate one or more decodable indicia within the multimedia content. In one embodiment, the computer can initiate locating operations responsive to downloading or acquiring multimedia content. In another embodiment, the computer can initiate locating operations within the multimedia content being downloaded or acquired via the imaging device. In a yet another embodiment, the computer can initiate locating operations responsive to receiving a user interface action (e.g., a GUI command to display multimedia content). In a yet another embodiment, the computer can look ahead and locate decodable indicia within the multimedia content being displayed.

At step 4030, the computer can transmit a decoding request comprising one or more images of decodable indicia to an external server for decoding.

Upon receiving a decoding result within the communication interface input loop 4040-4050, the computer can continue processing at step 4070. The decoding result can comprise the decoding operation completion code and/or the decoded message.

At step 4070, the computer can embed into the multimedia content the decoded message data provided by the decoded message and/or data derived from the decoded message, as described in details herein supra.

Responsive to receiving, within the GUI input loop 4080-4110, a GUI command to start displaying the multimedia content, the computer can, at step 4130, start displaying the content.

Responsive to receiving, within the GUI input loop 4080-4110, a MouseOver GUI event raised responsive to the user's hovering the screen pointer over an image of decodable indicia, the computer can, at step 4140, display the decoded message data provided by the decoded message and/or data derived from the decoded message within a tooltip associated with the screen pointer.

Responsive to receiving, within the GUI input loop 4080-4110, a GUI command to stop displaying the multimedia content, the computer can, at step 4150, stop displaying the multimedia content.

Either waiting for a decoding result during the Network Input loop 4040-4050 or responsive to receiving, within the GUI input loop 4080-4110, a GUI command not identified above, the computer can, at step 4160, process the received command, or perform other processing as necessary.

Responsive to establishing at step 4170 that the multimedia content has been fully displayed, the processing can terminate.

Figure 4B:
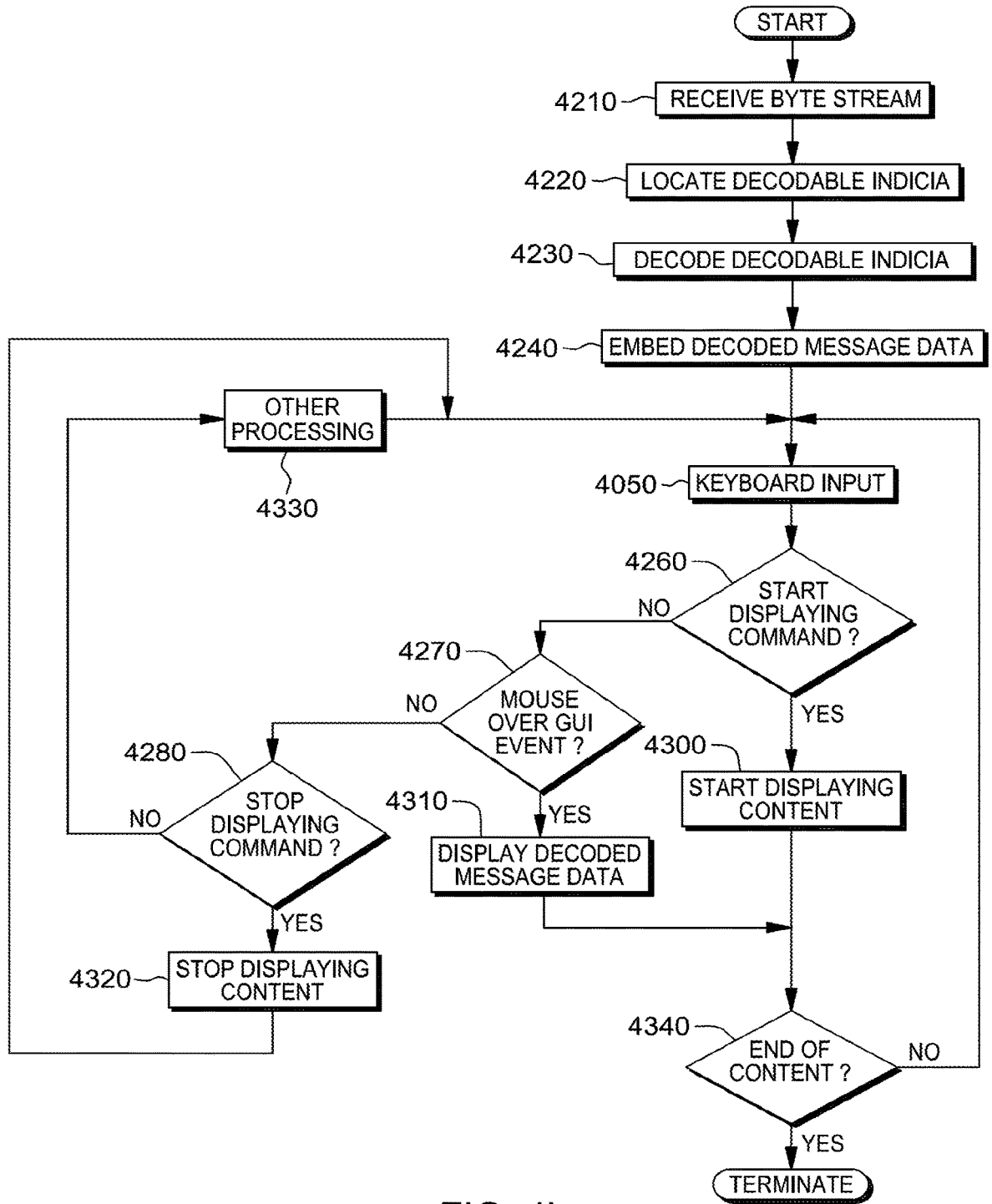

Another illustrative embodiment of a method of displaying content comprising one or more images of decodable indicia is now being described with references to the flowchart of FIG. 4b.

Processing commences by the computer receiving, at step 4210, a byte stream representing multimedia content including still images, video streams, document files, etc. In one embodiment, the computer can download the multimedia content over a communication interface. Alternatively, the computer can employ its imaging device to acquire multimedia content including still images and/or video streams. The received multimedia content can be stored in the memory of the computer.

At step 4220, the computer can locate one or more decodable indicia within the multimedia content. In one embodiment, the computer can initiate locating operations responsive to downloading or acquiring multimedia content. In another embodiment, the computer can initiate locating operations within the multimedia content being downloaded or acquired via the imaging device. In a yet another embodiment, the computer can initiate locating operations responsive to receiving a user interface action (e.g., a GUI command to display multimedia content). In a yet another embodiment, the computer can look ahead and locate decodable indicia within the multimedia content being displayed.

At step 4230, the computer can decode the decodable indicia to produce a decoding result comprising the decoding operation completion code and/or the decoded message.

At step 4240, the computer can embed into the multimedia content the decoded message data provided by the decoded message and/or data derived from the decoded message, as described in details herein supra.

Responsive to receiving, within the GUI input loop 4250-4280, a GUI command to start displaying the multimedia content, the computer can, at step 4300, start displaying the content.

Responsive to receiving, within the GUI input loop 4250-4280, a MouseOver GUI event raised responsive to the user's hovering the screen pointer over an image of decodable indicia, the computer can, at step 4310, display the decoded message data provided by the decoded message and/or data derived from the decoded message within a tooltip associated with the screen pointer.

Responsive to receiving, within the GUI input loop 4250-4280, a GUI command to stop displaying the multimedia content, the computer can, at step 4320, stop displaying the multimedia content.

Responsive to receiving, within the GUI input loop 4250-4280, a GUI command not identified above, the computer can, at step 4330, process the received command, or perform other processing as necessary.

Responsive to establishing at step 4340 that the multimedia content has been fully displayed, the processing can terminate.

The above described method of displaying content comprising one or more images of decodable indicia can, in one embodiment, be implemented within a plug-in for a content viewing program, such as an Internet browser. In another embodiment, the above described method can be implemented as an integral part of a content viewing program. A skilled artisan would appreciate the fact that various implementations of the above described method are within the scope of this disclosure.

Figure 5:
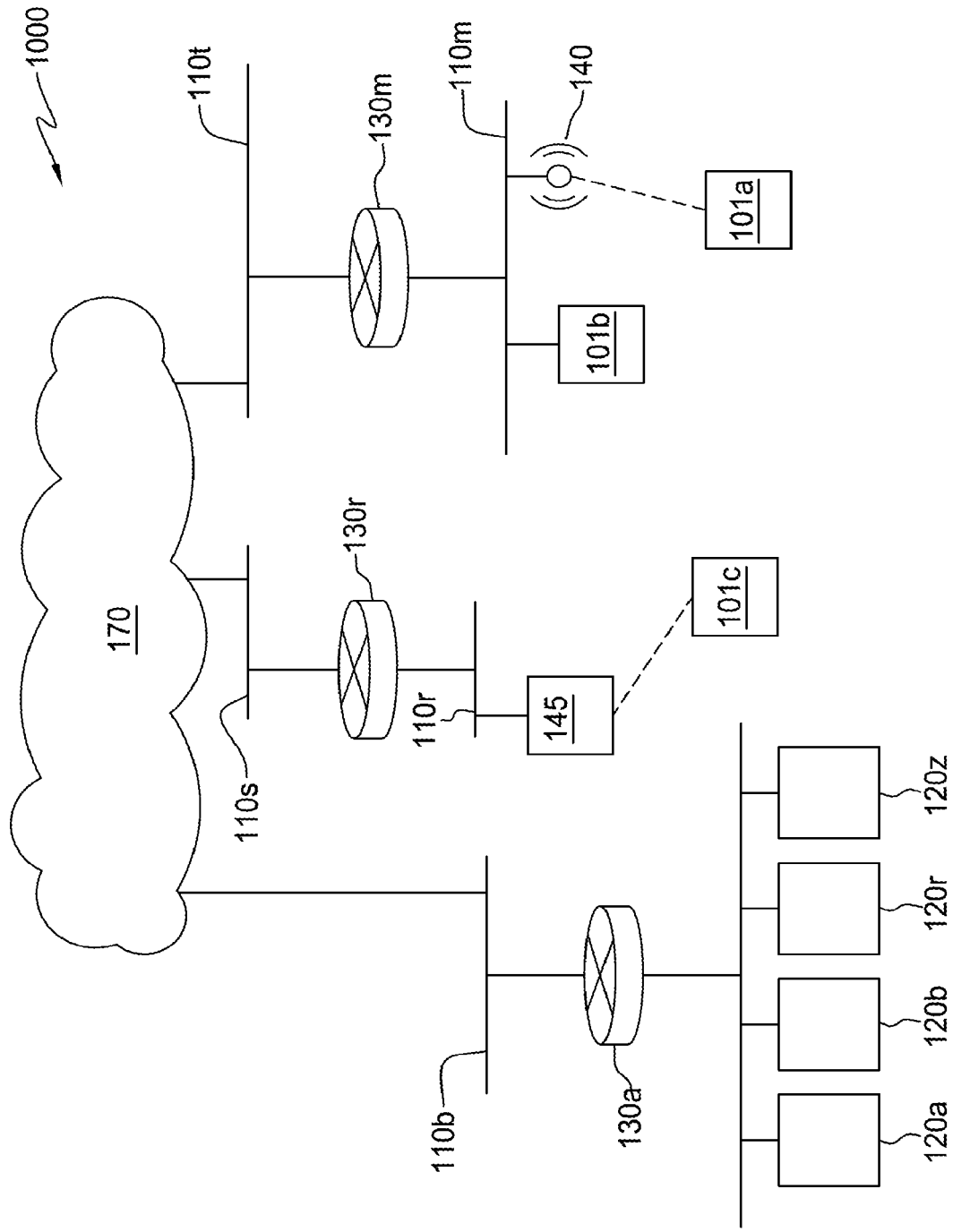
FIG. 5 schematically illustrates a component diagram of one embodiment of a data decoding system.

FIG. 5 schematically illustrates one embodiment of a decoding system described herein. The decoding system 1000 can comprise a plurality of decoding servers 120a-120z communicatively coupled to a network 110a. Network 110a can be provided, e.g., by Ethernet-based local area network, and can be communicatively coupled to the Internet 170 via one or more routers 130a and/or one or more networks 110b. An imaging client 101a can be provided, e.g., by a mobile communication terminal communicatively coupled to a local area network 110m via a wireless access point 140. Network 110m can be communicatively coupled to the Internet 170 via one or more routers 130m and/or one or more networks 110t. An imaging client 101b can be provided by an EIR terminal mounted into a POS workstation and can be communicatively coupled to the local area network 110m via an Ethernet communication interface. An imaging client 101c can be provided by a smart phone communicatively coupled to a provider's network 110r via a GSM/GPRS base station 145. Network 110r can be communicatively coupled to the Internet 170 via one or more routers 130r and/or one or more networks 110s.

In one embodiment, the decoding system 1000 can follow a cloud computing model, by providing an on-demand network access to a shared pool of configurable computing resources (e.g., servers, storage, applications, and/or services) that can be rapidly provisioned and released with minimal or no resource management effort, including interaction with the service provider, by the consumer (operator of a thin client). One characteristic of the cloud computing model is that a consumer can unilaterally provision computing capabilities, such as CPU power and storage capacity on the network, as needed automatically without requiring human interaction with the service's provider. The resources of the cloud can be accessed by thin clients over a network.

In another aspect, imaging clients can access cloud-based decoding applications executed by computers 120a-120z via a single point of entry, e.g., via a single IP address or uniform resource identifier (URI). In one embodiment, the single point of entry IP address can be assigned to a load balancing component provided, e.g., by router 130a or by a dedicated load balancer 120r. In another embodiment, the single point of entry URI can include a fully-qualified host name resolvable by a DNS server into one or more IP addresses of computers 120a-120z. In a yet another embodiment, the single point of entry URI can include a fully-qualified host name resolvable by a DNS server into an IP address of the dedicated load balancer 120r which can act as a server-side HTTP proxy by forwarding HTTP requests from the imaging clients 101a-101c to HTTP processes running on the decoding computers 120a-120z. The server-side HTTP proxy can preserve HTTP or application-level sessions by forwarding all TCP packets from one client to the same server. Thus, an imaging client accessing the cloud-based decoding applications can be agnostic with respect to the number of computers 120a-120z, topology of the local area networks 110a-110b, aspects of load balancing among the computers 120a-120z and other server-side implementation details.

For preventing unauthorized access to the cloud-based decoding services, decoding system 1000 can require an imaging client to be authenticated before processing any decoding requests.

In a further aspect, a decoding process can, responsive to completing a decoding operation, transmit the decoding operation result including decoded message data and/or the decoding operation completion code to the imaging client. The decoding operation completion code can, in one embodiment, contain a flag indicating whether the decoding operation was successful. In another embodiment, the decoding operation completion code can contain the number of decoding attempts performed. In a yet another embodiment, the decoding operation completion code can contain an extended error code indicating the reason for the decoding operation failure, for example, failed to locate decodable indicia, decodable indicia symbol truncated, insufficient image resolution, etc.

In another aspect, the imaging client can be provided by a large variety of imaging devices. In one embodiment, the imaging client can be provided by a mobile computing device (e.g., a smartphone or an encoded information reading (EIR) terminal) comprising an integrated imaging device or a peripheral imaging device. An integrated imaging device can be provided, e.g., by a two-dimensional imager incorporated into the housing of the mobile computing device and communicatively coupled to other components of the mobile computing device, including, e.g., a data bus, a processor, or a communication interface. A peripheral imaging device can be provided, e.g., by a still image or video camera disposed in a separate housing and communicatively coupled to the mobile computing device (e.g., via Bluetooth interface).

In another embodiment, the imaging client can be provided by a general purpose computing device (e.g., a notebook computer or a desktop computer) comprising an integrated imaging device or a peripheral imaging device. In a yet another embodiment, the imaging client can be provided by a computing device by a computing device integrated into a POS system (e.g., a retail cashier's workstation) comprising an integrated imaging device or a peripheral imaging device.

Figure 6:
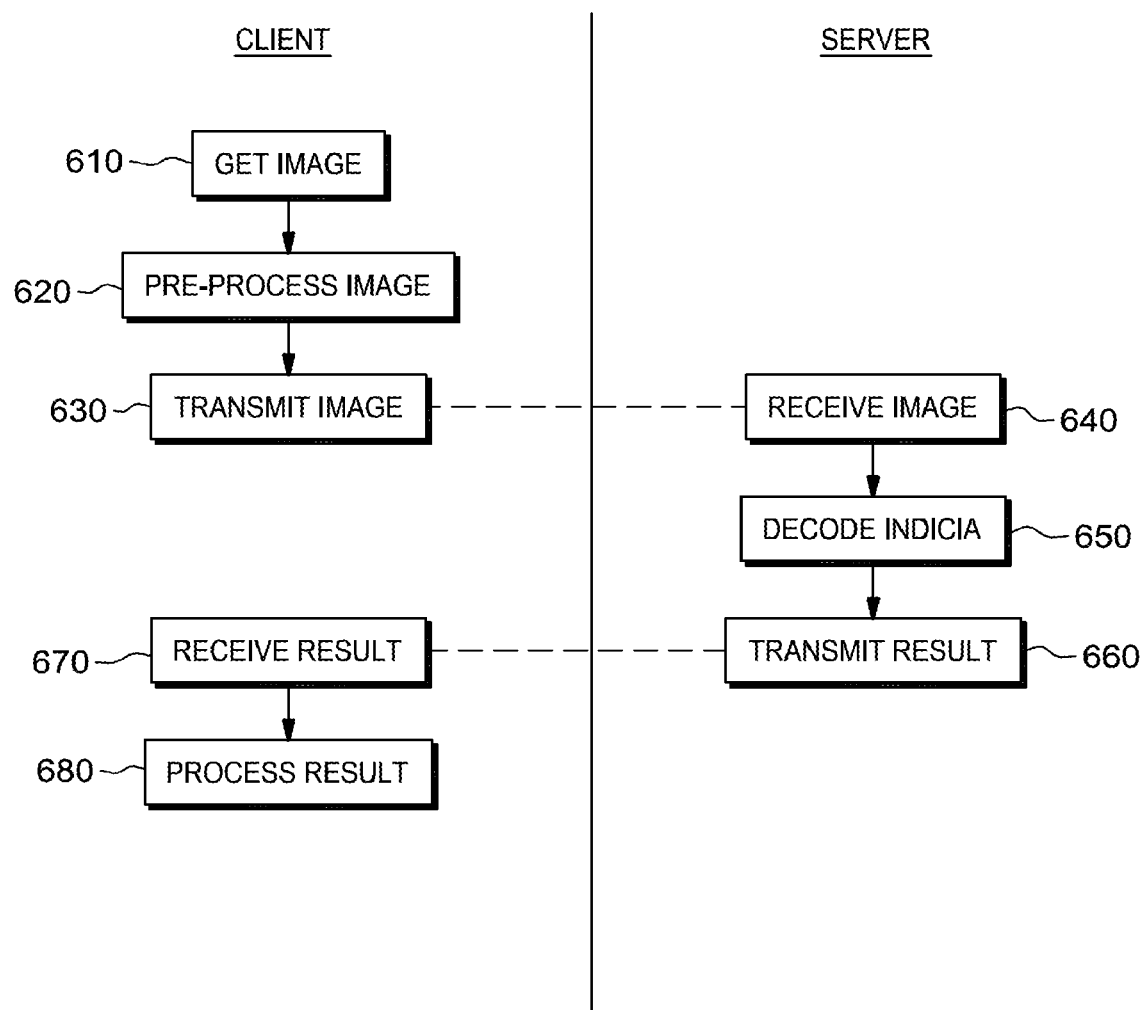
FIG. 6 depicts a flowchart of one embodiment of a method of decodable indicia decoding by the data decoding system.

FIG. 6 depicts a flowchart of one embodiment of a method of decodable indicia decoding by the above described data decoding system.

At step 610, an imaging client can acquire an image containing decodable indicia.

At step 620, the imaging client can pre-process the acquired image. In one embodiment, the pre-processing can comprise filtering images based on the image quality, as described in details herein supra. In another embodiment, the pre-processing can include scaling the acquired image, as described in details herein supra. In a further aspect, the pre-processing parameters can be dynamically adjusted based on one or more decoding operation completion codes received by the imaging client from a decoding server.

At step 630, the imaging client can transmit the pre-processed image to a decoding server over a communication network.

At steps 640-650, responsive to receiving the image, the decoding server can locate and decode the decodable indicia.

At step 660, the decoding server can transmit the decoding result to the imaging client over a communication network. In one embodiment, the decoding result can include one or more decoded messages and/or one or more decoding operation completion codes. The decoding operation completion code can contain a flag indicating whether the decoding operation was successful. In one embodiment, the decoding operation completion code can contain an extended error code indicating the reason for the decoding operation failure, for example, failed to locate decodable indicia, decodable indicia symbol truncated, insufficient image resolution, etc.

At steps 670-680, responsive to receiving the decoding result the imaging client can process the result, e.g., by displaying the decoded message and/or transmitting the decoded message to an external computer (e.g., transmitting a retail item identifier to a store server to retrieve the product information). After processing the decoding result at step 4080, the method can terminate.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A computer comprising:
a housing;
a microprocessor disposed within said housing;
a display;
a communication interface communicatively coupled to said microprocessor, said communication interface at least partially disposed within said housing;
wherein said computer is configured, responsive to locating decodable indicia within content viewable on said display, to decode said decodable indicia to produce at least one decoded message;
wherein said computer is further configured to display said content with decoded message data being embedded into said content;
wherein said decoded message data is provided by at least one of: said at least one decoded message, data derived from said at least one decoded message.

A2. The computer of (A1), wherein said content is provided by at least one of: a video stream, an image file, a document file.

A3. The computer of (A1), further configured to derive said decoded message data from said at least one decoded message by dereferencing a reference comprised by said decoded message.

A4. The computer of (A1), further configured to display said decoded message data responsive to a user interface action received while said content is being displayed.

A5. The computer of (A1), further configured to locate said decodable indicia within said content responsive to receiving a byte stream representing said content via said communication interface.

A6. The computer of (A1), further configured to display said content responsive to a user interface action.

A7. The computer of (A1), further configured to decode said decodable indicia by transmitting at least part of said content to an external computer for decoding.

A8. The computer of (A1), further comprising an encoded information reading (EIR) device selected from the group consisting of: a bar code reading device, an RFID reading device, and a card reading device;
wherein said EIR device is configured to perform at least one of: outputting raw message data containing an encoded message and outputting decoded message data corresponding to an encoded message.

A9. The computer of (A1), wherein said computer is provided by one of: a Personal Computer, a Macintosh, an EIR terminal, a smart phone, a mobile phone, and a personal digital assistant (PDA).

A10. The computer of (A1), wherein said communication interface is provided by a wireless communication interface.

B1. A method of displaying content comprising one or more images of decodable indicia by a computer, said method comprising the steps of:
locating decodable indicia within content viewable on said display;
decoding said decodable indicia to produce at least one decoded message; and
displaying said content with decoded message data being embedded into said content;
wherein said decoded message data is provided by at least one of: said at least one decoded message, data derived from said at least one decoded message.

B2. The method of (B1), wherein said content is provided by at least one of: a video stream, an image file, a document file.

B3. The method of (B1), wherein said decoded message data is derived from said at least one decoded message by dereferencing a reference comprised by said decoded message.

B4. The method of (B1), wherein said step of embedding said decoded message data comprises visually embedding said decoded message data into said content.

B5. The method of (B1), wherein said decoded message data is viewable responsive to a user interface action.

B6. The method of (B1), wherein said step of locating said decodable indicia is performed responsive to receiving a byte stream representing said content via said communication interface.

B7. The method of (B1), wherein said step of displaying said content is performed responsive to a user interface action.

B8. The method of (B1), wherein said step of decoding said decodable indicia is performed by transmitting at least part of said content to an external computer for decoding.

C1. A data decoding system comprising a client computer and one or more server computers communicatively coupled to a network, said one or more server computers executing at least one decoding process;
wherein said client computer is configured, responsive to locating decodable indicia within content viewable on said display, to transmit a decoding request comprising at least part of said content to said one or more servers;
wherein said at least one decoding process is configured, responsive to receiving said decoding request, to decode said decodable indicia into at least one decoded message;
wherein said at least one decoding process is further configured, responsive to completing a decoding operation, to transmit at least one of: said at least one decoded message, a decoding operation completion code to said client computer;
wherein said client computer is further configured to display said content with decoded message data being embedded into said content; and wherein said decoded message data is provided by at least one of: said at least one decoded message, data derived from said at least one decoded message.

C2. The data decoding system of (C1), wherein said content is provided by at least one of: a video stream, an image file, a document file.

C3. The data decoding system of (C1), wherein said client computer is configured to derive said decoded message data from said at least one decoded message by dereferencing a reference comprised by said decoded message.

C4. The data decoding system of (C1), wherein said client computer is further configured to visually embed said decoded message data into said content.

C5. The data decoding system of (C1), wherein said client computer is further configured to display said decoded message data responsive to a user interface action received while said content is displayed.

C6. The data decoding system of (C1), wherein said client computer is further configured to display said content responsive to a user interface action.

C7. The data decoding system of (C1), wherein said client computer comprises an encoded information reading (EIR) device selected from the group consisting of: a bar code reading device, an RFID reading device, and a card reading device;

wherein said EIR device is configured to perform at least one of: outputting raw message data containing an encoded message and outputting decoded message data corresponding to an encoded message.

The invention claimed is:

1. An apparatus comprising:
at least one processor and at least one memory, the at least one memory having computer-coded instructions therein, the computer-coded instructions configured to, in execution with the at least one processor, cause the apparatus to:
analyze at least one frame from a stream of content to identify at least one decodable indicia;
decode the at least one decodable indicia to produce at least one decoded message;
generate displayable content overlay that is derived from the at least one decoded message, wherein the displayable content overlay comprises at least one of the decoded message, data derived from the at least one decoded message, and a flag indicating whether the decode was successful; and
display the displayable content overlay.

2. The apparatus of claim 1, wherein the computer-coded instructions are configured to, in execution with the at least one processor, further cause the apparatus to display the displayable content overlay to be displayed in response to a user action.

3. The apparatus of claim 1, wherein the computer-coded instructions are configured to, in execution with the at least one processor, further cause the apparatus to:
display a selector overlay; and
receive an indication that the selector overlay hovered over the at least one decodable indicia for a predetermined period; wherein the at least one decodable indicia is decoded to produce the at least one decoded message is decoded in response to the indication.

4. The apparatus of claim 3, wherein the computer-coded instructions are configured to, in execution with the at least one processor, further cause the apparatus to:
remove the selector overlay in response to the display of the displayable content overlay.

5. The apparatus of claim 3, wherein the selector overlay is a defined area that is displayable on the display.

6. The apparatus of claim 1, wherein the computer-coded instructions are configured to, in execution with the at least one processor, further cause the apparatus to display the displayable content overlay with the stream of content, wherein the displayable content overlay is visually embedded in the stream of content.

7. The apparatus of claim 1, wherein the computer-coded instructions are configured to, in execution with the at least one processor, further cause the apparatus to:
display an acquired stream of content; and
in response to the at least one decodable indicia being decoded to produce the at least one decoded message; replace the acquired stream of content with the displayable content overlay.

8. The apparatus of claim 1, wherein the stream of content is received from an image sensor.

9. The apparatus of claim 1, wherein the displayable content overlay comprises the decoded message, wherein the at least one decodable indicia is a bar code, and the at least one decoded message is representative of an item.

10. A method comprising:
analyzing, using a processor, at least one frame from a stream of content to identify at least one decodable indicia;
decoding the at least one decodable indicia to produce at least one decoded message;
generating displayable content overlay that is derived from the at least one decoded message, wherein the displayable content overlay comprises at least one of the decoded message, data derived from the at least one decoded message, and a flag indicating whether the decode was successful; and
causing the displayable content overlay to be displayed.

11. The method of claim 10, further comprising wherein the displayable content overlay is caused to be displayed in response to a user action.

12. The method of claim 10, further comprising:
causing a selector overlay to be displayed; and
receiving an indication that the selector overlay is placed over the at least one decodable indicia for a predetermined period; wherein the at least one decodable indicia is decoded to produce the at least one decoded message is decoded in response to the indication.

13. The method of claim 12, further comprising:
removing the selector overlay in response to the display of the displayable content overlay.

14. The method of claim 12, wherein the selector overlay is a defined area that is displayable on the display.

15. The method of claim 10, further comprising causing the displayable content overlay to be displayed with the stream of content, wherein the displayable content overlay is visually embedded in the stream of content.

16. The method of claim 10, further comprising:
causing an acquired stream of content to be displayed; and
in response to the at least one decodable indicia being decoded to produce the at least one decoded message; causing the acquired stream of content to be displayed with the displayable content overlay.

17. The method of claim 10, wherein the stream of content is received from an image sensor.

18. The method of claim 10, wherein the displayable content overlay comprises the decoded message, wherein the at least one decodable indicia is a bar code, and the at least one decoded message is representative of an item.

19. A method comprising:
causing multimedia content to be displayed;
analyzing, using a processor, at least one frame from a stream of received content to identify at least one decodable indicia;
decoding the at least one decodable indicia to produce at least one decoded message;
generating displayable content overlay that is derived from the at least one decoded message, wherein the displayable content overlay comprises at least one of the decoded message, data derived from the at least one decoded message, and a flag indicating whether the decode was successful; and
causing the displayable content overlay to be displayed, wherein the displayable content overlay is visually embedded with the multimedia content or is displayed instead of the multimedia content.

20. The method of claim 19, wherein the displayable content overlay comprises the decoded message, wherein the at least one decodable indicia is a bar code, and the at least one decoded message is representative of an item.

\* \* \* \* \*